March 11, 1969   M. SHENKER ET AL   3,432,219
WIDE FIELD OPTICAL VIEWER WITH CONCAVE MIRROR EYEPIECE
Filed Aug. 21, 1962   Sheet 1 of 3

INVENTORS
MARTIN SHENKER
JOSEPH LA RUSSA
GEORGE THOMAS NERSHI
BY Pennie Edmonds Morton Barrows & Taylor
ATTORNEYS March 11, 1969    M. SHENKER ET AL    3,432,219
WIDE FIELD OPTICAL VIEWER WITH CONCAVE MIRROR EYEPIECE
Filed Aug. 21, 1962    Sheet 2 of 3
FIG. 10
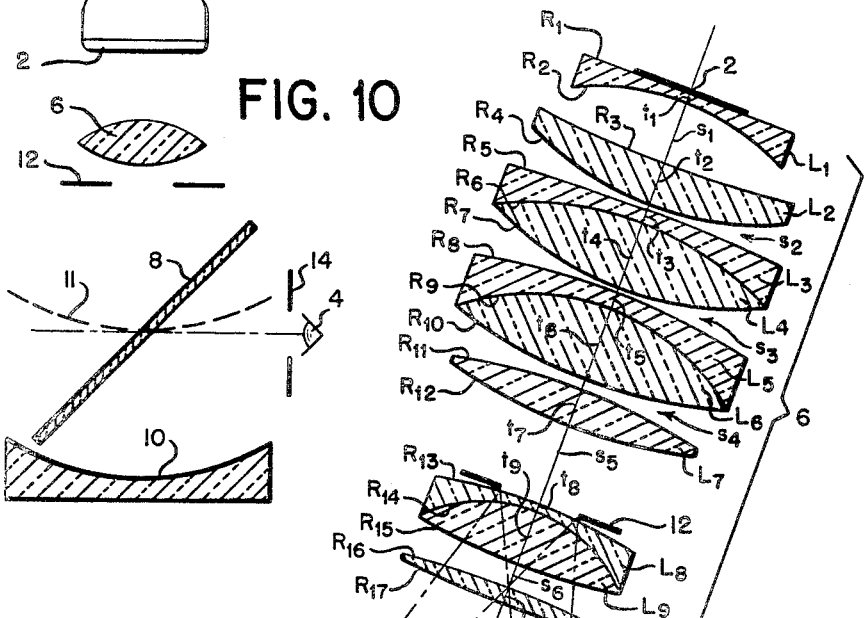
FIG. 2
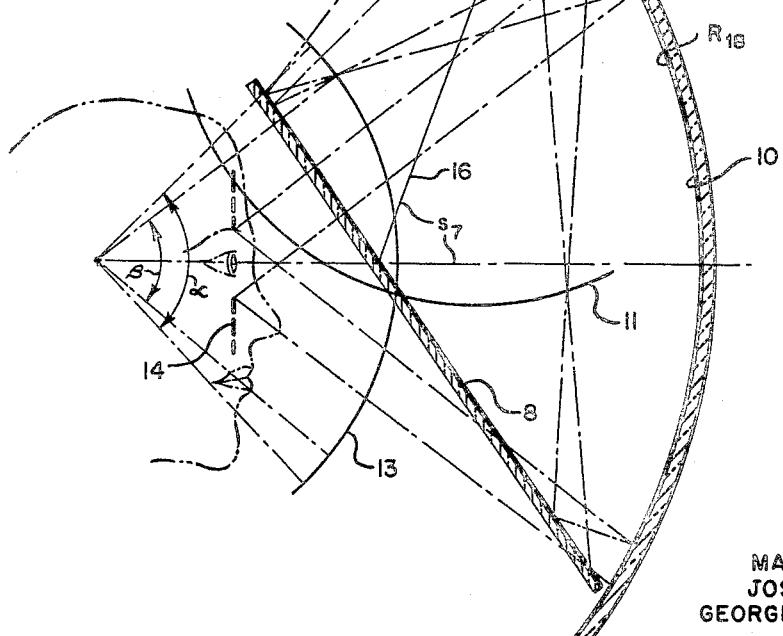
INVENTORS
MARTIN SHENKER
JOSEPH LA RUSSA
GEORGE THOMAS NERSHI
BY
Pennie Edmonds Morton Barrows & Taylor
ATTORNEYS

INVENTORS
MARTIN SHENKER
JOSEPH LA RUSSA
GEORGE THOMAS NERSHI 3,432,219
WIDE FIELD OPTICAL VIEWER WITH
CONCAVE MIRROR EYEPIECE
Martin Shenker, Monsey, and Joseph La Russa, Yonkers, N.Y., and George Thomas Nershi, River Edge, N.J., assignors to Farrand Optical Co., Inc., New York, N.Y., a corporation of New York
Filed Aug. 21, 1962, Ser. No. 218,413
U.S. Cl. 350—29          8 Claims
Int. Cl. G02b *17/00, 13/06, 9/00*

The present invention relates to image-forming instruments which present at or near infinity an image of a wide field object. The invention provides such a system having a large exit pupil, accommodating for example both of the user's eyes simultaneously and leaving to him considerable freedom for head movement before he starts to lose the image with one or the other eye.

The invention described herein was made in the performance of work under a NASA contract and is subject to the provisions of Section 305 of the National Aeronautics and Space Act of 1958, Public Law 85–568 (72 Stat. 435; 42 U.S.C. 2457).

In the accompanying drawings:

FIG. 2 is a diagram illustrating a preferred embodiment of the invention; and

FIGS. 3 to 10 are diagrams of other embodiments of the invention.

Figure 1:
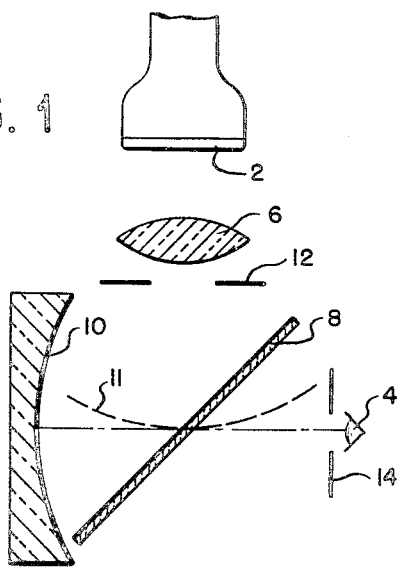
FIG. 1 is a diagram illustrating one embodiment of the invention.

In FIG. 1, the object to be viewed is indicated at 2, where it is represented by way of example only as being the face of a cathode ray tube. An image of this object is presented at infinity or substantially infinity to a viewer having his eye or eyes at 4, by means of an optical system comprising a lens of positive power diagrammatically indicated at 6, a partially reflective plane beam-splitting mirror 8, and a concave mirror 10 which may be spherical for example.

In accordance with the invention, the object 2 and lens 6 are so positioned that the lens 6 forms a real, aerial image of the object in the vicinity of the focus of the mirror 10. This image is indicated at the dashed line 11 in FIG. 1. This aerial image 11 constitutes the object for the mirror 10, which forms an image of that "object" at infinity. In accordance with another feature of the invention, the aperture stop of the system, indicated at 12 in FIG. 1 (which acts as the exit pupil of the lens 6) is located optically distant from the mirror 10 by substantially the radius of curvature of that mirror. This exit pupil is then imaged by the mirrors 8 and 10 to the location 14, also distant from mirror 10 by the radius of curvature thereof, to locate the exit pupil of the system in a position suitable for placement there of the eye or eyes of the user of the instrument.

FIG. 2 illustrates in detail by way of example an actual design for such an instrument, employing a spherical mirror of 18 inch radius of curvature, having a field of view of approximately 90° in both azimuth and elevation, an exit pupil diameter of four inches, an effective focal length of approximately four inches, a relative aperture of substantially unity, and a magnifying power of approximately 2.5.

The system of FIG. 2 includes a positive lens 6, optionally describable as a projection lens, beam-splitter 8 and concave mirror 10 as does that of FIG. 1. The mirror 10 in FIG. 2 is in fact spherical. For a plane object indicated at 2, located in the plane of the first surface $R_1$ of the lens 5, the focal surface of the image of that object produced by the lens 6 is indicated at 11, adjacent the intersection of the system axis 16 with the mirror 8. The image of this focal surface in the beam-splitting mirror 8 is indicated at 13, and it is the image 13 which is in turn imaged at or near infinity by the mirror 10, the image 13 being distant from the mirror 10 by substantially one half the radius of curvature of mirror 10.

The surface 11 in FIG. 2 is concave toward the object at 2, as is normally the case with a lens of positive power not corrected to possess a flattened field. This curvature is obtained as the sum of the Petzval curvature contributions of the various refracting surfaces in the lens 6.

For each surface, the Petzval curvature is the ratio of its dioptric power to the product of the indices of refraction on the two sides of the surface.

Otherwise stated, the Petzval contribution to curvature of the image surface made by any image-forming surface, whether refracting or reflecting, is given by the quantity:

$$\frac{n_2 - n_1}{n_1 n_2 R}$$

wherein R is the radius of curvature of the image-forming surface and $n_1$ and $n_2$ are respectively the indices of refraction of the media from which and into which the light passes at that surface. This quantity has the dimension of reciprocal length, and represents the curvature of the image of an infinite plane object produced by that surface. In the case of a reflecting surface, $n_2 = -n_1$.

The lens 6 contains ten elements $L_1$ to $L_{10}$ and is of high quality. In accordance with the invention however, the numerous possibilities for correction which are present in such a multielement lens have been employed for the minimization of aberrations other than field curvature, since in accordance with the invention the field curvature of the lens 6 is compensated by the field curvature of opposite sign introduced by the concave mirror 10.

In known fashion, the plane beam-splitter 8 may be rendered partially reflective on one surface and substantially nonreflective on the other surface. The beam-splitter may alternatively take the form of a thin film pellicle or alternatively a beam-splitting cube.

The aperture stop, indicated at 12, may take the form of a mask on the rear face $R_{13}$ of one of the components $L_8$ of the lens 6. The image of this aperture stop in the lens elements $L_8$ to $L_{10}$ and in the mirrors 8 and 10 successively is shown at 14, and constitutes the final exit pupil of the system. It is seen to be of substantial size.

Identifying the elements of the lens 6 as $L_1$ to $L_{10}$, and the mirror 10 as having a radius of curvature $R_{18}$, the data for this system are as follows:

TABLE

| Element | Radii (mm.) | Thickness (mm.) | Spacing (mm.) | Index | Abbe number $\nu$ |
|---|---|---|---|---|---|
| $L_1$ | $R_1 = \infty$<br>$R_2 = +167.5$ | $t_1 = 10.2$ | $s_1 = 48.8$ | 1.517 | 64.5 |
| $L_2$ | $R_3 = -1642.$<br>$R_4 = -249.8$ | $t_2 = 36.1$ | $s_2 = 1.5$ | 1.517 | 64.5 |
| $L_3$ | $R_5 = +1,406$ | $t_3 = 10.8$ | | 1.720 | 29.2 |
| $L_4$ | $R_6 = +276.8$<br>$R_7 = -233.2$ | $t_4 = 54.1$ | $s_3 = 1.5$ | 1.517 | 64.5 |
| $L_5$ | $R_8 = +608.0$ | $t_5 = 10.8$ | | 1.720 | 29.2 |
| $L_6$ | $R_9 = +181.3$<br>$R_{10} = -402.0$ | $t_6 = 57.7$ | $s_4 = 8.7$ | 1.517 | 6.4 |
| $L_7$ | $R_{11} = +382.8$<br>$R_{12} = -367.2$ | $t_7 = 28.8$ | $s_5 = 59.4$ | 1.517 | 64.5 |
| $L_8$ | $R_{13} = +300.4$ | $t_8 = 7.2$ | | 1.720 | 29.2 |
| $L_9$ | $R_{14} = +109.8$<br>$R_{15} = -531.8$ | $t_9 = 43.2$ | $s_6 = 18.5$ | 1.517 | 64.5 |
| $L_{10}$ | $R_{16} = +672.8$<br>$R_{17} = -1,642.$ | $t_{10} = 10.5$ | $s_7 = 561.7$ | 1.649 | 33.8 |
| Concave mirror | $R_{18} = -457.2$ | | | | |

The focal length $f$ of the entire system is 3.947 inches, or 100.3 mm.

In the system for which data are given in Table 1, the Petzval sum of the elements $L_1$ to $L_{10}$ is $+0.0056759$ reciprocal mm. and that of the mirror 10 is $-0.0043744$ reciprocal mm.

The system axis in FIG. 2 is indicated at 16, defined by the axis of the lens 6, with reflection in the mirrors 8 and 10. It will be observed from the coincidence of axis 16 with itself on approach to and departure from mirror 10, that the axis 16 intersects the mirror 10 normally. The concave mirror 10 is thus being operated "on-axis."

By operating the spherical mirror on-axis or substantially on-axis, there may be achieved good compensation of the field curvature from the projection lens 6 by that of the spherical mirror, and freedom from the lateral aberrations which accompany off-axis operation of a spherical mirror. More generally, such on-axis operation contributes to achievement of a wide field of view, a high quality of image, and a large exit pupil.

In the embodiment of FIG. 2, the geometrical axis of the lens 6 has on the mirror 8 an angle of incidence different from and less than 45°, whereas in FIG. 1 the corresponding angle is 45°. This is a consequence of the detailed design of the system of FIG. 2.

The instruments of the invention may be employed as microscopes, of wide field and, typically, of low power, wherein the lens 6 constitutes the objective and the mirror 10 the eyepiece. Such a system has a magnification given by the product of the magnification of the lens 6 times ten over the focal length of the mirror 10 in inches, ten inches being the conventional viewing distance of the naked eye. In the system of FIG. 2 and Table 1, the magnification of the lens 6 for an object on the face $R_1$ of $L_1$ is 9/4.

The magnifying power of the system as a microscope is therefore: $9/4 \times 10/9$ or approximately 2.5, achieved with a wide field of view and a relative aperture of unity. This is an application of the usual statement that the magnification of a microscope is the magnification of the objective multiplied by ten over the focal length in inches of the eyepiece. FIG. 2 shows that in azimuth the instrument has a field $\alpha$ of 90°. In elevation, its field $\beta$ may be of the order of 75°.

The system of FIG. 2 has an effective focal length of substantially four inches. This may be derived as the product of the focal length of the mirror 10, considered for the moment as an objective, times the linear magnification (here a minification) produced by the lens 6 which may be considered for ocnvenience in this connection as an erecting system. The focal length of the mirror 10 is substantially nine inches, in the example of Table 1. The lens 6 produces from the image surface 11 to the object surface $R_1$ of $L_1$ a minification of 4/9, or, in the opposite direction, a magnification of 9/4 from the surface $R_1$ of $L_1$ to the surface 11. Hence the focal length of the entire system of Table 1 is nine times 4/9 or four inches.

Consequently, considering the entire system as a visual instrument with an object in the surface $R_1$ of $L_1$, the magnifying power of the system is ten divided by the focal length of the system in inches, or $10/4 = 2.5$ as already indicated.

The relative aperture of the system, determined as the ratio of the focal length to the diameter of its exit pupil is approximately $4''/4''$ or unity.

An important advantage of the invention is that, by the use of a concave mirror (which can be made of large aperture at low cost) as the secondary imaging element in a compound system, corresponding illustratively to the eyepiece in a microscope, there is obviated the necessity of providing a field lens at the location of the image produced by the first lens 6, such as would be necessary with a refractive "eyepiece."

According to one feature of the invention the sum of the Petzval field curvature contributions of the elements of the lens 6, plus the curvature of the object, if any, are proportioned to the radius of curvature of the mirror 10 according to the relation:

$$x/R_m < -C^*_p < y/R_m \quad (1)$$

where $x$ and $y$ have respectively the values 4 and 1, wherein $R_m$ is the radius of curvature of the mirror 10 (considered negative for a concave mirror), and wherein $C^*_p = C_p + C'_p$. In this last equation, $C_p$ is the reciprocal of the radius of curvature of the object surface, considered positive for a convex object, and $C'_p$ is the sum of the Petzval field curvature contributions of the lenticular or other elements which form the image presented to the mirror 10. Otherwise stated, $C'_p$ is the reciprocal of the radius of curvature of the image produced by the elements of the lens 6 of a plane object. Thus for a perfect match:

$$2/R_m = -C^*_p$$

The inequality (1) is to be applied algebraically to the continuous set of values extending from $-\infty$ to $+\infty$ such that, for example:

$$-5 < -4 < +1$$

Figure 9:
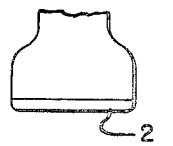

FIG. 9 shows another embodiment of the invention similar to that of FIG. 1, wherein however there has been substituted for the first surface concave mirror 10 a Mangin mirror 20. The mirror 20 has the shape of a negative meniscus lens, and is silvered on its convex surface to reflect light after refraction at the concave surface. The Mangin mirror permits selection or retention of a desired focal length for the element 20 while adjusting the Petzval curvature contribution thereof in a way which is not possible with a first surface spherical mirror. If the Petzval contribution of the Mangin mirror is written $C_{IM}$ (considered negative for a positive Mangin mirror), in accordance with the invention the sum $C^*_p$ previously defined is to be related to the Petzval curvature of the Mangin mirror 20 by the relation:

$$x'C_{IM} < -C^*_p < y'C_{IM} \quad (2)$$

where $x'$ and $y'$ have respectively the values 2 and 1/2.

Figure 3:
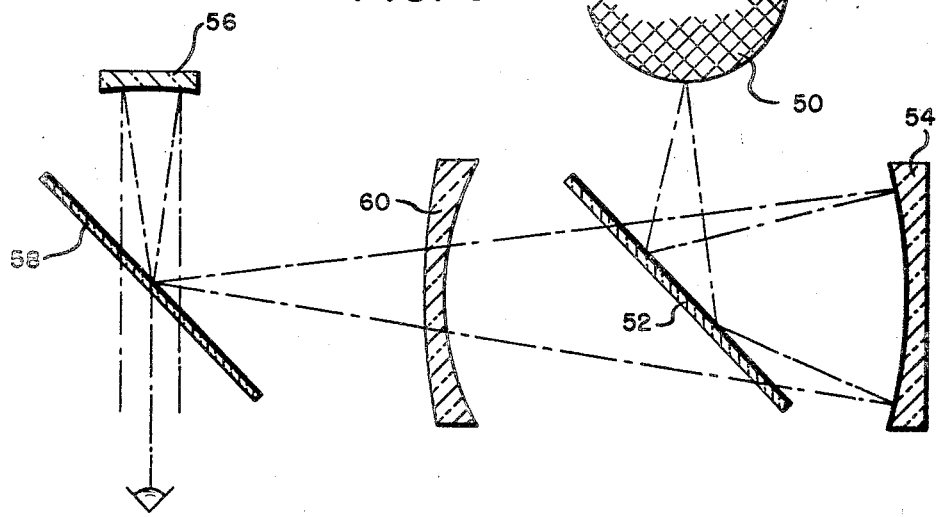
Figure 4:
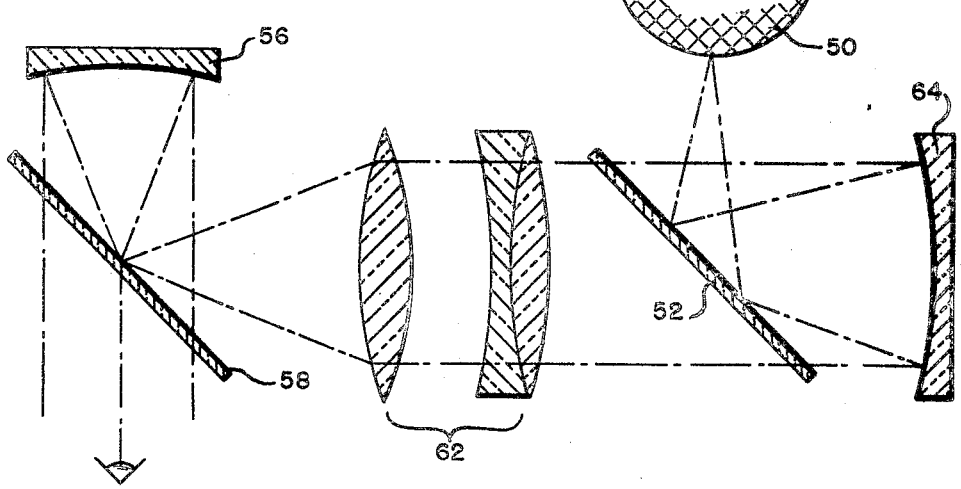

FIGS. 3 and 4 illustrate further embodiments of the invention, especially suited to the viewing of object surfaces which are convex. In FIG. 3, a convexly curved object is shown at 50. A first semitransparent plane mirror 52 reflects light from the object onto a first concave spherical mirror 54, which serves the function of the positive lens 6 of FIGS. 1 and 2, forming a real image of the object 50 adjacent the focus of the concave spherical mirror 56, which corresponds to the mirror 10 of FIGS. 1 and 2. A beam-splitting plane mirror 58, corresponding to the mirror 8 of FIGS. 1 and 2, cooperates with the mirror 56 for presentation to the observer of an image at infinity. A lenticular correction element 60 may be introduced into the system if desired.

In the embodiment of FIG. 3, the mirror 54, by its Petzval curvature contribution, which is opposite in sign to that of a lenticular element such as the lens 6 of FIGS. 1 and 2, serves to reduce to a tolerable (i.e., compensable) level the curvature of the image surface presented as object to the mirror 56, whereas a lenticular projection system would increase it.

FIG. 4 illustrates another embodiment similar to that of FIG. 3, in which however formation of a real image for the primary spherical mirror 56 is shared between a projection lens 62 and a concave spherical mirror 64, which in respect of Petzval curvature contribution performs a function similar to that of the mirror 54 in FIG. 3.

The inequality criteria (1) and (2) are applicable to the embodiments of FIGS. 3 and 4 as well as to those of FIGS. 1 and 2 (and 5 to 10). As so applied, the quanity $C'_p$ refers to the Petzval contribution of the image-forming elements 54 and 60 in FIG. 3 and 64 and 62 in FIG. 4 for presentation of an image to the concave mirror 56. The contributions of the elements 54 and 64 are negative.

FIGS. 5 to 8 show a member of embodiments of the invention in which the structure of FIG. 1 has been incorporated into a device providing a 360° panoramic optical display to an observer. Such devices may be useful as simulators for the training of pilots, astronauts and the like. In the devices of FIGS. 5 to 8, the spherical mirror 10 is enlarged into a zone of a sphere. As in FIG. 1, the observer positions his eye or eyes at or near the center of curvature of the spherical mirror.

Specifically, referring to FIG. 5, there is shown a spherical mirror 22 having the shape of a zone of a sphere, the zone extending above and below an equatorial plane of the sphere indicated at 24. Suitably mounted within the mirror 22 is a beam-splitting mirror 26. The mirror 26 may be pyramidal with four or any suitable larger number of faces, or it may be conical in shape.

An object to be viewed is indicated in the form of a film 28, which may be cylindrical in shape, either circularly cylindrical or cylindrical with a polygonal cross-section. One or more positive lenses are provided as indicated at 30, each defining an optical axis as indicated at 32, to produce a real image of the film at or near the focus of the spherical mirror for that axis, in accordance with the principles already described in connection with FIG. 1.

Presentation of the image or images from film 28 thus properly positioned with respect to the mirror 22 may be achieved with a pyramidal or conical completely reflecting mirror 34, which serves to deviate the optical axes 32 through 90°.

The film 28 is illuminated by means of a source located at 36, which may take the form of an arc or incandescent lamp. Condensing lenses are indicated at 38 for concentrating the light from this source on the film. With the embodiment of FIG. 5 there is displayed to the observer in panoramic fashion an image which may be made to constitute, for example, a realistic representation of a large zone above and below the horizon.

The conical shape described as one of the shapes suitable for the mirrors 26 and 34 will introduce some astigmatism in the horizontal meridian, but that of the mirror 34, if conical, will in part compensate for the astigmatism thus introduced by a conical shape for the mirror 26.

Figure 7:
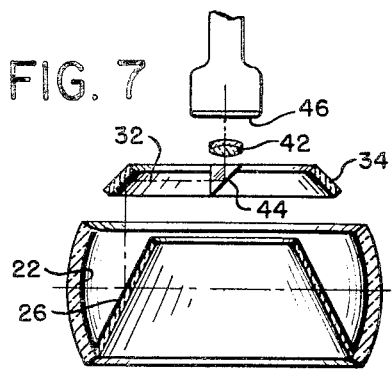
Figure 5:
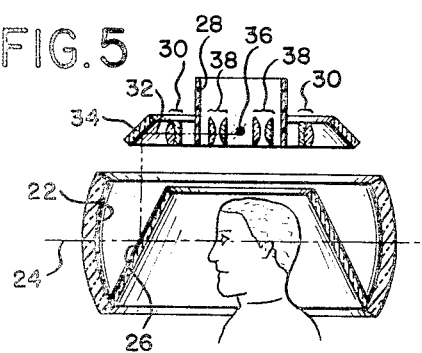
Figure 8:
Figure 8:
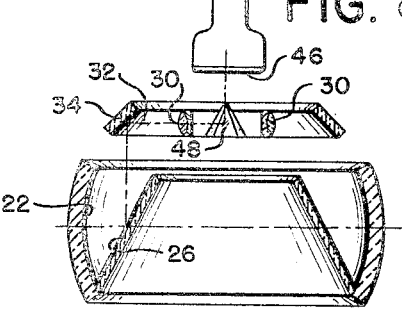
Figure 6:
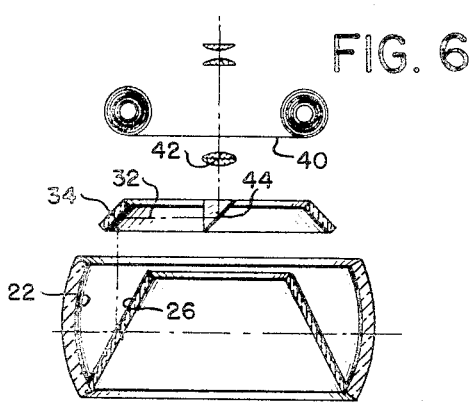

FIGS. 6, 7 and 8 illustrate variations on the embodiment of FIG. 5. In FIGS. 6 to 8, the elements 22, 26 and 34 may be the same as the correspondingly numbered elements in FIG. 5. In FIG. 6 however the object, provided by the film 40, has an image thereof projected by the lens 42 with the aid of a prism 44 to the vicinity of the intersection of the axis 32 with mirror 26. The prism 44 may be rotated about a vertical axis, by means not shown.

In FIG. 7 the object takes the form of a cathode ray tube 46, having for example a radial scan for the presentation of a so-called P.P.I. or plan position indicator picture. The embodiment of FIG. 7 may in other respects be similar to that of FIG. 6.

In FIG. 8, the object is a cathode ray tube 46 as in FIG. 7, but there is provided, instead of the rotating prism 44, a convex conical or pyramidal mirror 48, operating in conjunction with lenses 30 as illustrated in FIG. 5.

While the invention has been described in terms of a number of preferred embodiments, it is not restricted thereto. Thus the instrument of the invention has been described herein as producing for the user thereof an image at or near infinity and as having the aerial image which serves as object for the concave mirror located at the focus of that mirror. In such a case, the rays representative of each point in the original object cross the exit pupil in the form of a collimated bundle. This represents a desirable condition in that, as the user moves his head thereby to shift his eyes across the exit pupil, the apparent direction with respect to him of the various object points will not change. Particularly, if this condition is preserved over the whole field of view, the instrument may be said to be well corrected across the field of view, and the object will not be seen by the user to "swim" with such head motion.

The invention is not limited to such arrangements however. Here, as with the case of telescopic instruments, the user may find it more comfortable to receive in his eyes slightly divergent light. Conveniently then the aerial image may be "inside" the focus of the spherical mirror, i.e optically between that focus and the spherical mirror, in which case the viewer will see, in slightly diverging light, an image at a finite distance, as is usual with microscopes of the ordinary sort.

Conversely, that aerial image may be optically farther from the concave mirror than the focal length thereof, although the result of such an object position is the presentation of converging light to the user, which is usually uncomfortable to him. This may however be of no importance if the instrument is not to be used visually.

Neither is it necessary that the exit pupil of the objective (the lens 6 in FIG. 1, the mirror 54 in FIG. 3 or the mirror 64 and lens 62 in FIG. 4) be optically distant from the "eyepiece" spherical mirror by exactly the radius of curvature thereof. In the embodiment of FIG. 2 indeed, the exit pupil of the instrument as a whole, constituting the image in the mirrors 8 and 10 of the aperture stop 12 is distant from the mirror 10 along the optical axis approximately fourteen inches, whereas the corresponding image of the exit pupil of the lens system 6 is located some twenty-five inches from the vertex of mirror 10.

Moreover there is in all embodiments, or at least in those other than embodiments such as those of FIGS. 5 to 8 which undertake to cover a very large angle in azimuth, an alternative position for the "eyepiece" concave mirror, i.e., the mirror 10 of FIGS. 1 and 2. This alternative position is the image in mirror 8 of the position of the mirror 10 shown in FIGS. 1 and 2. Such an embodiment is illustrated in FIG. 10 of the drawings.

Indeed concave mirrors may be provided in both positions.

Any of the systems according to the invention may be scaled up or down in size. For example, the system illustrated in FIG. 2 and for which data are given in Table 1 may be reduced in dimensions by a factor of 100 to produce an instrument having a magnifying power of 250, and an exit pupil of 1 mm. diameter, with an angular field still of 90°.

Conversely, the instrument of FIG. 2 and Table 1 may be increased in dimensions by a factor of four, for example, to produce an instrument having a magnifying power of five eighths, and an exit pupil sixteen inches in diameter, also preserving an angular field of 90°.

With respect to embodiments such as that of FIG. 9 which employ a Mangin mirror, it is not necessary that such Mangin mirror be of negative meniscus shape, nor even of meniscus shape. It might instead be plano-convex or doubly convex in shape, in case less instead of more negative Petzval contribution is desired.

These and other variations upon the structures disclosed herein, such as will suggest themselves to the man skilled in the art, are to be understood as comprehended within the invention, the scope of which is set forth in the appended claims.

We claim:

1. An image-forming optical instrument comprising means to define a position for an object, image-forming means having positive power and an axis to form at a surface in space intersected by that axis a rear aerial image of an object on said position-defining means, a partially transparent and partially reflecting mirror disposed obliquely across said axis, the intersection of said axis with said mirror being adjacent to the intersection of said axis with said surface, and a concave mirror having its concave side facing said partially transparent mirror and disposed in one of two positions, the first position for said concave mirror being that in which said concave mirror is intersected by said axis as transmitted through said partially transparent mirror and is distant from said surface by substantially its own focal length, the second position for said concave mirror being that in which said concave mirror is intersected by said axis as reflected in said partially transparent mirror and is distant by substantially its own focal length from the image of said surface in said partially transparent mirror, the negative of the sum obtained by adding the Petzval curvature contributions of said image-forming means to the reciprocal of the radius of curvature of said object lying between one and four times the reciprocal of the radius of curvature of said concave mirror.

2. An image-forming instrument according to claim 1 wherein said image-forming means include a lens.

3. An image-forming instrument according to claim 1 wherein said image-forming means include a concave mirror and a partially transmitting and partially reflecting plane mirror.

4. A wide field microscope comprising means to define a position for an object, a lenticular objective of positive power adapted to form on a specified surface in space a real aerial image of an object on said position-defining means, a partially transparent and partially reflecting plane mirror obliquely disposed across the axis of said objective and intersected by that axis adjacent the intersection of that axis with said surface, and an eyepiece concave mirror having its concave side facing said partially transparent mirror and disposed in one of two positions, the first position for said concave mirror being that in which said concave mirror is intersected by said axis as transmitted through said partially transparent mirror and is distant from said specified surface substantially by its own focal length, the second position for said concave mirror being that in which said concave mirror is intersected by said axis as reflected in said partially transparent mirror and is distant substantially by its own focal length from the image of said specified surface in said partially transparent mirror, the negative of the sum of the Petzval curvature of said objective plus the reciprocal of the radius of curvature of said object lying between one and four times the reciprocal of the radius of curvature of said concave mirror.

5. A wide field microscope comprising means to define a position for an object, a lenticular objective of positive power adapted to form on a specified surface in space a real aerial image of an object on said position-defining means, a partially transparent and partially reflecting plane mirror obliquely disposed across the axis of said objective and intersected by that axis adjacent the intersection of that axis with said surface, and an eyepiece concave mirror having its concave side facing said partially transparent mirror and disposed in one of two positions, the first position for said concave mirror being that in which said concave mirror is intersected substantially normally by said axis as transmitted through said partially transparent mirror and is distant from said specified surface substantially by its own focal length, the second position for said concave mirror being that in which said concave mirror is intersected substantially normally by said axis as reflected in said partially transparent mirror and is distant substantially by its own focal length from the image of said specified surface in said partially transparent mirror, the negative of the sum of the Petzval curvature of said objective plus the reciprocal of the radius of curvature of said object lying between one and four times the reciprocal of the radius of curvature of said concave mirror.

6. A wide field microscope according to claim 5 including means defining an aperture stop optically distant from said concave mirror by substantially the radius of curvature of that concave mirror.

7. A wide field microscope comprising means to define a position for an object, a lenticular objective of positive power adapted to form on a specified surface in space a real aerial image of an object on said position-defining means, a partially transparent and partially reflecting plane mirror obliquely disposed across the axis of said objective and intersected by that axis adjacent the intersection of that axis with said surface, and a Mangin mirror having its concave side facing said partially transparent mirror and disposed in one of two positions, the first position for said Mangin mirror being that in which said Mangin mirror is intersected substantially normally by said axis as transmitted through said partially transparent mirror and is distant from said specified surface substantially by its own focal length, the second position for said Mangin mirror being that in which said Mangin mirror is intersected substantially normally by said axis as reflected in said partially transparent mirror and is distant substantially by its own focal length from the image of said specified surface in said partially transparent mirror, the negative of the sum of the Petzval curvature of said objective plus the reciprocal of the radius of curvature of said object lying between one-half and two times the Petzval curvature of the Mangin mirror.

8. An image-forming optical instrument comprising means to define a position for an object, a first partially transparent and partially reflecting plane mirror in front of said means, a first concave mirror having an axis and positioned to receive light from an object in said position via said first plane mirror and to form from said light via said first plane mirror a real aerial image of said object on a surface intersected by said axis, a second partially transmitting and partially reflecting plane mirror disposed obliquely across said axis and intersected thereby adjacent the intersection of said axis with said surface, and a second concave mirror having its concave side facing said second plane mirror and disposed in one of two positions, the first position for said second concave mirror being that in which said second concave mirror is intersected by said axis as transmitted through said second plane mirror and is distant from said surface by substantially its own focal length, the second position for said second concave mirror being that in which said second concave mirror is intersected by said axis as reflected in said second plane mirror and is distant by substantially its own focal length from the image of said surface in said second plane mirror, the negative of the sum of the Petzval curvature contribution of said first concave mirror plus the reciprocal of the radius of curvature of said object lying between one and four times the reciprocal of the radius of curvature of said second concave mirror.

References Cited

UNITED STATES PATENTS

| | | |
|---|---|---|
| 2,045,120 | 6/1936 | Carpenter. |
| 2,482,115 | 9/1949 | Laird. |
| 2,490,747 | 12/1949 | Creighton _____ 88—2.3 |
| 2,510,080 | 6/1950 | Cuneo. |
| 2,570,219 | 10/1951 | Drake _____ 88—14 |
| 2,628,533 | 2/1953 | Oetjen. |
| 2,741,940 | 4/1956 | Drodofsky. |
| 2,742,817 | 4/1956 | Altman. |
| 2,883,908 | 4/1959 | Copeland. |
| 3,000,255 | 9/1961 | Iddings. |
| 3,059,519 | 10/1962 | Stanton. |

FOREIGN PATENTS 731,759   6/1955   Great Britain.

DAVID H. RUBIN, *Primary Examiner.*

U.S. Cl. X.R.

178—7.88; 350—21, 27, 55, 198, 199, 214

UNITED STATES PATENT OFFICE
CERTIFICATE OF CORRECTION

Patent No. 3,432,219   March 11, 1969

Martin Shenker et al.

It is certified that error appears in the above identified patent and that said Letters Patent are hereby corrected as shown below:

Column 2, line 10, "5" should read -- 6 --. Column 3, in the Table, last column, line 6 thereof, "6.4" should read -- 64.5 --. Column 7, line 30 "rear" should read -- real --.

Signed and sealed this 14th day of April 1970.

(SEAL)
Attest:

Edward M. Fletcher, Jr.
Attesting Officer

WILLIAM E. SCHUYLER, JR.
Commissioner of Patents